(12) United States Patent
Wigard et al.

(10) Patent No.: US 7,860,000 B2
(45) Date of Patent: Dec. 28, 2010

(54) APPARATUS, METHODS AND COMPUTER PROGRAM PRODUCTS PROVIDING ESTIMATION OF ACTIVITY FACTOR AND ENHANCED RADIO RESOURCE MANAGEMENT

(75) Inventors: Jeroen Wigard, Klarup (DK); Daniela Laselva, Aalborg (DK); Troels E. Kolding, Klarup (DK); Malek Boussif, Aalborg (DK)

(73) Assignee: Nokia Corporation, Espoo (FI)

( * ) Notice: Subject to any disclaimer, the term of this patent is extended or adjusted under 35 U.S.C. 154(b) by 329 days.

(21) Appl. No.: 11/985,611

(22) Filed: Nov. 15, 2007

(65) Prior Publication Data

US 2008/0212468 A1 Sep. 4, 2008

Related U.S. Application Data

(60) Provisional application No. 60/859,439, filed on Nov. 16, 2006.

(51) Int. Cl.
*H04J 1/16* (2006.01)
*H04J 3/14* (2006.01)
*H04W 72/00* (2009.01)
*H04B 7/00* (2006.01)

(52) U.S. Cl. ............ 370/230; 370/236; 370/236.1; 370/252; 455/453; 455/522

(58) Field of Classification Search ............ 370/230, 370/236, 236.1, 252, 342

See application file for complete search history.

(56) References Cited

U.S. PATENT DOCUMENTS

| 5,745,854 | A | 4/1998 | Schorman | 455/452 |
|---|---|---|---|---|
| 6,985,739 | B2 * | 1/2006 | Spaling et al. | 455/453 |
| 2003/0202490 | A1 * | 10/2003 | Gunnarsson et al. | 370/332 |

(Continued)

FOREIGN PATENT DOCUMENTS

EP 1 672 941 A1 6/2006

(Continued)

OTHER PUBLICATIONS

Zhao, F et al., "Multiple-criteria call admission control scheme for ATM networks", IEEE Proceedings: Communications, Institution of Electrical Engineers, GB, vol. 148, No. 3, Jun. 15, 2001, pp. 175-180.

(Continued)

*Primary Examiner*—Chi H Pham
*Assistant Examiner*—Farah Faroul
(74) *Attorney, Agent, or Firm*—Harrington & Smith

(57) ABSTRACT

In one non-limiting, exemplary embodiment, a method includes: estimating an activity factor for a priority class based at least in part on a provided bit rate for the priority class and a guaranteed bit rate of the priority class; and using the estimated activity factor to estimate at least one network-related parameter. In another non-limiting, exemplary embodiment, a method includes: obtaining a measurement for a priority class; and estimating an activity factor for the priority class based at least in part on the measurement and a quality of service attribute of the priority class. As a non-limiting example, exemplary embodiments of this invention employ a framework providing an estimation of effective activity factor per service priority indicator (SPI) class to provide, for example, enhanced quality of service awareness in radio resource management functionality, such as for estimation of the amount of power used per SPI class/group.

30 Claims, 2 Drawing Sheets

U.S. PATENT DOCUMENTS

| | | | |
|---|---|---|---|
| 2003/0210660 A1* | 11/2003 | Wiberg et al. | 370/320 |
| 2006/0002318 A1 | 1/2006 | Kuurne | 370/310 |
| 2006/0079265 A1* | 4/2006 | Masuda | 455/522 |
| 2006/0182065 A1* | 8/2006 | Petrovic et al. | 370/332 |
| 2006/0252446 A1* | 11/2006 | Zhang | 455/522 |
| 2008/0039108 A1* | 2/2008 | Shapira | 455/450 |
| 2008/0259812 A1* | 10/2008 | Racz et al. | 370/252 |

OTHER PUBLICATIONS

3GPP TS 25.321 V7.1.0 (Jun. 2006) $3^{rd}$ Generation Partnership Project: Technical Specification Group Radio Access Network; Medium Access Control (MAC) protocol specification, (Release 7), Section 11.8.2.4, p. 84.

3GPP TS25.321 V7.2.0 (Sep. 2006) $3^{rd}$ Generation Partnership Project; Technical Specification Group Radio Access Network; Medium Access Control (MAC) protocol specification, (Release 7).

3GPP TS 25.433 V7.2.0 (Sep. 2009) $3^{rd}$ Generation Partnership Project; Technical Specification Group Radio Access Network; UTRAN lub interface Node B Application Part (NBAP) signaling, (Release 7).

* cited by examiner

APPARATUS, METHODS AND COMPUTER PROGRAM PRODUCTS PROVIDING ESTIMATION OF ACTIVITY FACTOR AND ENHANCED RADIO RESOURCE MANAGEMENT

CROSS-REFERENCE TO RELATED APPLICATIONS

This patent application claims priority under 35 U.S.C. §119(e) from U.S. Provisional Patent Application No.: 60/859,439, filed Nov. 16, 2006, the disclosure of which is incorporated by reference herein in its entirety.

TECHNICAL FIELD

The exemplary and non-limiting embodiments of this invention relate generally to wireless communication systems, methods, devices and computer program products and, more specifically, relate to techniques for performing admission control of wireless communication system users.

BACKGROUND

The following abbreviations are herewith defined:
3G third generation of GSM-based mobile networks
3GPP third generation partnership project
AC admission control
AF activity factor
ARP allocation/retention priority
BLER block error rate
CQI channel quality indicator
DCH dedicated channel
DL downlink (Node B to UE)
DPCH dedicated physical channel
$E_b/N_0$ energy per bit per noise power spectral density
E-DCH enhanced UL DCH
EPBR E-DCH provided bit rate
GBR guaranteed bit rate
GSM global system for mobile communication
HC handover control
HSDPA high-speed downlink packet access
HS-DSCH high-speed downlink shared channel
HS-SCCH high-speed shared control channel
HSUPA high speed uplink packet access
Iu interconnection point between RNC or BSC and 3G core network
Iub RNC/Node B interface
Iur RNC/RNC logical interface
LC load control
MAC medium access control
MAC-hs MAC-high speed
NBAP Node B application part
Node B base station
NRT non-real time
PDP packet data protocol
PDU protocol data unit
PIE power increase estimator
PS packet scheduler
RNC radio network controller
RRM radio resource management
RT real time
SPI scheduling priority indicator
TC traffic class
THP traffic handling priority
UE user equipment, such as a mobile station or mobile terminal
UL uplink (UE to Node B)
UMTS universal mobile telecommunications system
Uu radio interface between UTRAN and UE
UTRAN universal terrestrial radio access network
VoIP voice over internet protocol
WCDMA wideband code division multiple access When performing admission control in a system, that includes HSDPA, for a new user of a certain priority and with certain requirements, which can be expressed in GBR and maximum delay constraints, the admission control function of the RNC needs to know what the required power is of the existing users. The required power depends on the QoS requirements of the existing users. The Node B provides a required power attribute per priority class (SPI). This required power is defined as "the minimum necessary power for a given priority class to meet the Guaranteed Bit Rate for all the established HS-DSCH connections belonging to this priority class", and assumes 100% user activity.

As can be appreciated, the RNC needs to have knowledge of the AF of the users in order to know the actual required power per SPI class.

The AF follows the user behavior and defines the percentage of the time that the user (the UE associated with the user) is active. The effective value may vary significantly among users. For certain real time services, such as VoIP, a fixed AF would be a quite accurate measure (e.g., AF=50% for conversational applications and AF=100% for streaming applications). However, the estimation of the AF becomes a non-trivial issue for non-real time (NRT) applications since the user behavior for NRT services can vary considerably and, moreover, it can depend significantly on the network status. For example, a wireless network with a low load would provide a higher user throughput for non-real time users triggering, on average, greater user activity and vice versa. In this case the actual AF might be measured in the RNC according to the data received and transmitted. However, this approach would not be adequate, as the value of AF would vary considerably depending on the averaging period that was used. It is noted that for NRT services AC can be performed in order to guarantee a minimum bit rate.

SUMMARY

In an exemplary aspect of the invention, a method includes: estimating an activity factor for a priority class based at least in part on a provided bit rate for the priority class and a guaranteed bit rate of the priority class; and using the estimated activity factor to estimate at least one network-related parameter.

In another exemplary aspect of the invention, a program storage device readable by a machine, tangibly embodying a program of instructions executable by the machine for performing operations, the operations including: estimating an activity factor for a priority class based at least in part on a provided bit rate for the priority class and a guaranteed bit rate of the priority class; and using the estimated activity factor to estimate at least one network-related parameter.

In another exemplary aspect of the invention, an apparatus including: a memory configured to store a provided bit rate for a priority class and a guaranteed bit rate of the priority class; and a processor configured to estimate an activity factor for the priority class based at least in part on the provided bit rate and the guaranteed bit rate, wherein the processor is further configured to use the estimated activity factor to estimate at least one network-related parameter.

In another exemplary aspect of the invention, a method including: obtaining a measurement for a priority class; and estimating an activity factor for the priority class based at least in part on the measurement and a quality of service attribute of the priority class.

In another exemplary aspect of the invention, a program storage device readable by a machine, tangibly embodying a program of instructions executable by the machine for performing operations, the operations including: obtaining a measurement for a priority class; and estimating an activity factor for the priority class based at least in part on the measurement and a quality of service attribute of the priority class.

In another exemplary aspect of the invention, an apparatus including: a memory configured to store a measurement for a priority class; and a processor configured to estimate an activity factor for the priority class based at least in part on the measurement and a quality of service attribute of the priority class.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Section 1

By way of introduction, at least some exemplary embodiments of this invention are related at least in part to the utilization of HSDPA-specific QoS parameters and optional MAC-hs performance measurements in order to derive measures for use in, for example, QoS-aware admission control decisions and load control for HSDPA. The exemplary embodiments of this invention enable the estimation of an activity factor of HSDPA users based on a HS-DSCH-provided bit rate measurement report from the Node-B to the RNC, and on the GBR and its use in RRM algorithms. Note that the HS-DSCH provided bit rate is a measurement, per priority (SPI) group, of the bit rate provided during the previous measurement period, where the measurement period is defined as 100 ms as per, for example, 3GPP TS25.321, V7.2.0 (2006-09), Technical Specification Group Radio Access Network; Medium Access Control (MAC) protocol specification (Release 7).

Future HSDPA networks are expected to carry several multimedia services with different QoS needs (i.e., in terms of guaranteed bit rate and delay constraints). The exemplary embodiments of this invention may employ more advanced HSDPA QoS features to further optimize the network performance. 3GPP has specified a general QoS concept capable of providing different levels of QoS by using UMTS-specific control mechanisms plus HSDPA QoS parameters and measurement reports. However, the related mechanisms and details concerning their utilization are left open to the equipment vendors and to the network operators.

The estimation of the activity factor may, for example, be used to estimate the used power per priority class, which in turn may be used for QoS-based admission control to adjust the HS-DSCH required power. That is, the AC uses the adjusted required power for AC decisions. As was noted above, the HS-DSCH required power attribute is defined by 3GPP TS25.433, V7.2.0 (2006-10), Technical Specification Group Radio Access Network, UTRAN Iub Interface Node B Application Part (NBAP) signaling (Release 7) as "the minimum necessary power for a given priority class to meet the Guaranteed Bit Rate for all the established HS-DSCH connections belonging to this priority class", and assumes 100% activity. This attribute is sent from the Node B to the RNC.

One important advantage that is gained by the use of the exemplary embodiments of this invention is a simple estimation of the effective AF (e.g., averaged per SPI group).

Figure 1:
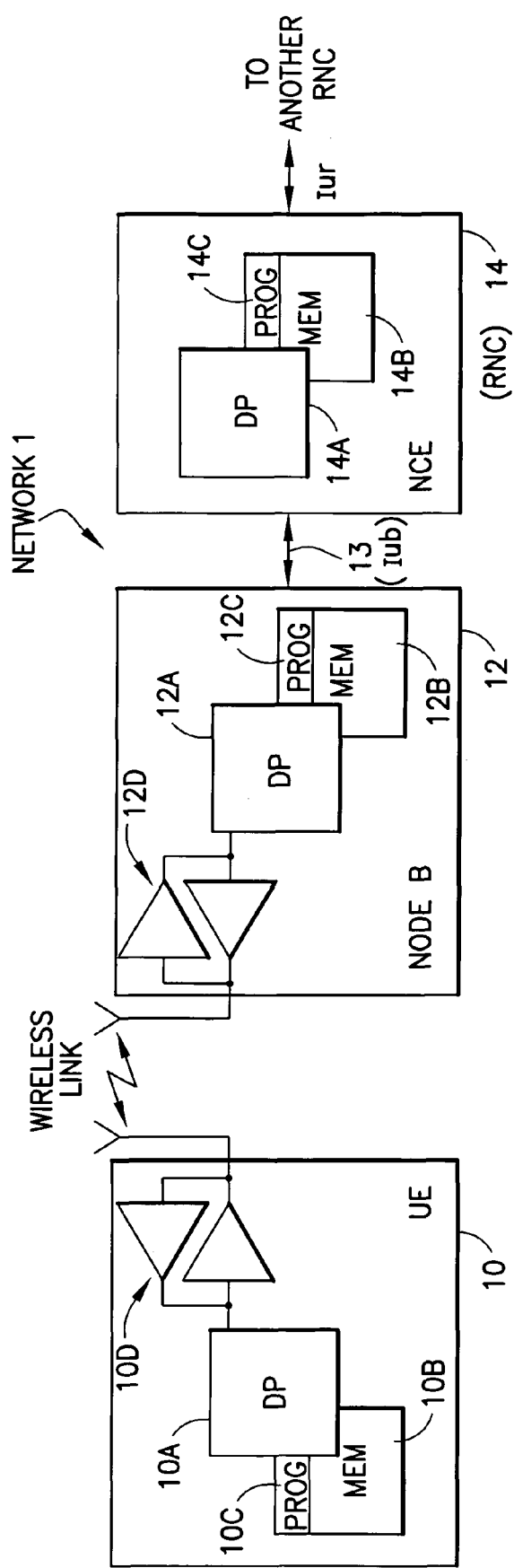
FIG. 1 shows a simplified block diagram of various electronic devices that are suitable for use in practicing the exemplary embodiments of this invention.

Reference is made to FIG. 1 for illustrating a simplified block diagram of various electronic devices that are suitable for use in practicing the exemplary embodiments of this invention. In FIG. 1 a wireless network 1 is adapted for communication with a UE 10 via a Node B (base station) 12. The network 1 may include a network control element (NCE) 14, which in this case may be, or may include, the RNC. The UE 10 includes a data processor (DP) 10A, a memory (MEM) 10B that stores a program (PROG) 10C, and a suitable radio frequency (RF) transceiver 10D for bidirectional wireless communications with the Node B 12, which also includes a DP 12A, a MEM 12B that stores a PROG 12C, and a suitable RF transceiver 12D. The Node B 12 is coupled via a data path 13 (Iub) to the NCE (RNC) 14 that also includes a DP 14A and a MEM 14B storing an associated PROG 14C. The RNC 14 may include an Iur for coupling to another RNC (not shown). At least one of the PROGs 12C, 14C is assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by at least DP, or by hardware, or by a combination of software and hardware.

In general, the various embodiments of the UE 10 can include, but are not limited to, terminals, mobile electronic devices, mobile phones, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Figure 2:
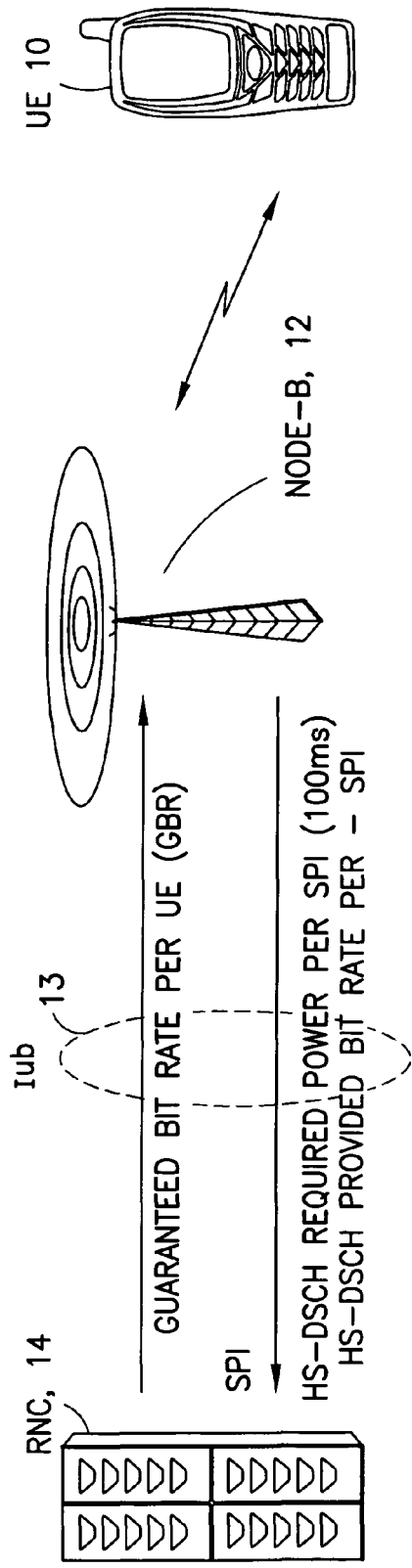
FIG. 2 is another view of the devices shown in FIG. 1, and which also illustrates certain RNC-Node B signaling that is of interest to the exemplary embodiments of this invention.

Reference may be made as well to FIG. 2, which shows in accordance with exemplary embodiments of this invention certain optional MAC-hs performance measurements which are signaled from the Node-B 12 to the RNC 14. The HS-DSCH power measurements available in the Iu and Uu interfaces are cell-level measurements provided every 100 ms, per SPI group. The GBR is a HSDPA QoS optional parameter set in the RNC 14 and signaled to Node-B 12, where it may be employed to control the MAC-hs scheduler.

As will be described in further detail, exemplary embodiments of this invention employ a framework that comprises an estimation of the AFs per SPI group and a mechanism for utilizing this information to provide, as a non-limiting example, enhanced QoS awareness in the RRM functionality, for example, in the estimation of the amount of power used per SPI group. The framework may be considered as, for example, an enhancement for the current AC, LC and HC functionality of the RNC 14.

In general, the AC determines whether a user is admitted to the system based on the priority of the new user and existing users, and also the used resources (e.g., power, hardware, transport, etc.). In order to make the admission decision the AC needs to know how much power is used by the existing users and how much power the new user requires in order to fulfill its QoS constraints. This can be determined based on the required power and the AF. The HC may utilize the same or similar information in order to determine whether a user can be handed over from one cell to another (e.g., the HC should check the AC of the new cell, possibly using different parameters). The LC monitors the load of the system and takes load-related actions, for example, to lower the bit rates of users when the system is approaching or is in an overload condition. For this to occur, the used power per priority class is needed, and in order to estimate this accurately the AF should be used.

As a non-limiting example, and still referring to FIG. 2, with respect to the framework the QoS interface in the Iub interface 13 for HSDPA includes the Node B 12 feedback measurements sent to the RNC 14 every 100 ms (as anon-limiting example). This feedback may comprise the HS-DSCH provided bit rate representing the average cell bit rate for all HSDPA users with the same SPI value, and the HS-DSCH required power as the minimum necessary power to meet the GBR in a certain SPI. The required GBR and the priority indication SPI are sent to the Node B 12 from the RNC 14.

In the following discussion, certain exemplary and non-limiting embodiments of the measuring framework are described, along with aspects related to the use of the measurement in the AC and LC functions.

The activity factor per SPI, averaged over all the HS-DSCH connections belonging to the SPI group, can be derived as follows:

$$A\hat{F}_{avg}(SPI_k) = \frac{HS\text{-}DSCH \text{ Provided Bit Rate }(SPI_k)}{\sum_{x \in SPI_k} GBR(x)}, \quad (1)$$

where HS-DSCH Provided Bit Rate ($SPI_k$) is the provided bit rate for the SPI group k, and GBR(x) is the GBR of user x (UE x) having priority SPI k. Assume that a GBR value is set to any connection, including best effort traffic (for best effort traffic the GBR can be used as a minimum bit rate on the HSDPA, since every user consumes hardware resources). For NRT best effort connections one may expect to have a minimum GBR defined so that the AF for the best effort SPI group would be:

$$A\hat{F}_{avg}(BestEffort) = \frac{HS\text{-}DSCH \text{ Provided Bit Rate }(SPI = best \text{ } effort)}{\sum_{x \in SPI_{BestEffort}} GBR(x)}. \quad (2)$$

Note that the GBR is assumed to be set for best effort traffic and, in such cases, the GBR may be seen as a minimum bit rate (e.g., a min GBR(x)).

Two non-limiting applications of the estimated AF are illustrated in the following examples.

EXAMPLE 1

Prediction of the Used Power for Existing HSDPA Connections Based on the Estimated AF The HSDPA required power measurements are reported at the cell level, per SPI group, and it may be assumed that every user would request its GBR 100% of the time. This implies that the AF may be used to estimate the used power:

$$\hat{P}_{usedBestEffort} = HS\text{-}DSCH \text{ Required Power}(SPI=best \text{ } effort) \cdot A\hat{F}_{avg}(BestEffort), \quad (3)$$

where HS-DSCH Required Power per SPI is the minimum required power to meet the GBR of all the connections in a certain SPI group.

It should be noted that such a formulation represents an accurate estimation of the effective used power.

EXAMPLE 2

Prediction of the QoS Provision in Terms of the Bit Rate Based on the Estimated AF The following measure is indicative of how much bit rate is provided as compared to a promised bit rate (minimum GBR) per SPI group:

$$\frac{HS\text{-}DSCH \text{ }ProvidedBR}{\sum_{x \in SPI} GBR(x)} \geq 1. \quad (4)$$

The same AF may be required in the estimation of overload such that the AF makes it possible to consider the QoS provision within each SPI class.

The framework described above may then be used as input parameters to the AC, LC, and HC algorithms, and these functions may then make their decisions based on the actual existing activity requirements in the system, as opposed to using maximum requirements (which lead to potentially very conservative, or at least less efficient, RRM algorithms).

The foregoing exemplary embodiments of this invention are clearly beneficial in WCDMA/HSDPA systems, but their use is not limited thereto, as other types of wireless communications systems may benefit from their use in providing a simple and flexible QoS-aware RRM. That is, while the exemplary embodiments have been described above in the context of WCDMA/HSDPA systems, it should be appreciated that the exemplary embodiments of this invention are not limited for use with only this one particular type of wireless communication system, and that they may be used to advantage in other wireless communication systems.

Based on the foregoing it should be apparent that the exemplary embodiments of this invention provide methods, apparatus and computer program products to accurately estimate the AF, and furthermore enable making a more accurate estimation of the power that is needed per SPI group, thus enabling higher cell throughput.

Figure 3:
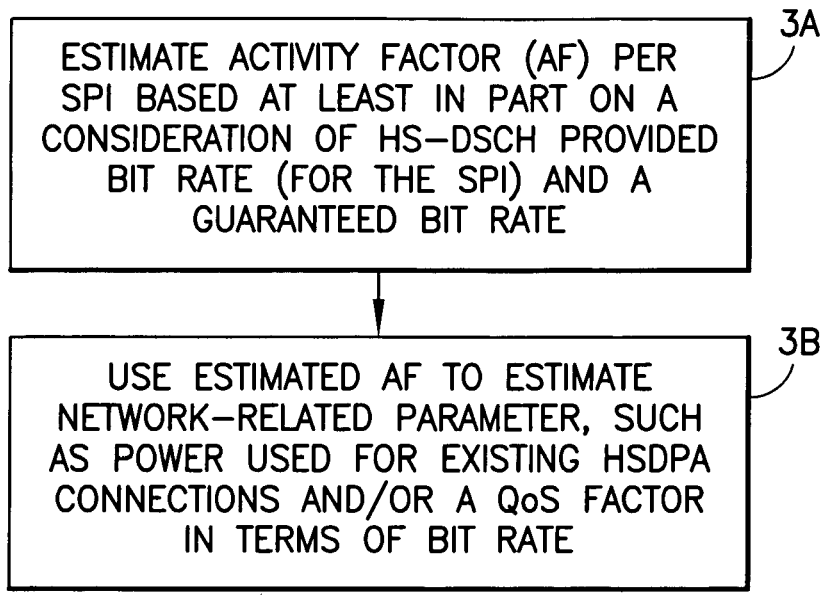
FIG. 3 is a logic flow diagram that is illustrative of the operation of a method and a computer program product in accordance with the exemplary embodiments of this invention.

Referring to FIG. 3, and in accordance with a method (and a computer program product) that are aspects of this invention, at Block 3A an estimation of the AF per SPI is made based at least in part on a consideration of HS-DSCH provided bit rate (for the SPI) and the guaranteed bit rate, and at Block 3B the estimated AF is used to estimate some network-related parameter, such as the power used for existing HSDPA connections and/or a QoS factor in terms of bit rate. In the method the estimated AF per SPI is averaged over all HS-DSCH connections belonging to the SPI group. The SPI may be a best effort SPI, and in this case the guaranteed bit rate is a minimum guaranteed bit rate.

The various blocks shown in FIG. 3 may be viewed as method steps, and/or as operations that result from operation of computer program code, and/or as a plurality of coupled logic circuit elements constructed to carry out the associated function(s).

As such, the exemplary embodiments of this invention also pertain to a unit that comprises part of a wireless network node to estimate the AF per SPI based at least in part on a consideration of HS-DSCH provided bit rate (for the SPI) and the guaranteed bit rate. An output of the AF estimation unit may be used to estimate some network-related parameter, such as the power used for existing HSDPA connections and/or a QoS factor in terms of bit rate. The unit includes means to average the estimated AF per SPI over all HS-DSCH connections belonging to the SPI group. The SPI may be a best effort SPI, and in this case the guaranteed bit rate is a minimum guaranteed bit rate.

The exemplary embodiments of this invention further pertain to a unit that comprises part of a wireless network node, such as the RNC, and that comprises means for estimating the AF per SPI. An output of the AF estimation means may be used for RRM purposes, such as estimating some network-related parameter. Examples of network-related parameters include, but are not limited to, the power used for existing HSDPA connections and/or a QoS factor in terms of bit rate. The AF estimation means may receive as inputs an indication of HS-DSCH provided bit rate (for the SPI) and an indication of a guaranteed bit rate. The unit may further comprise means for averaging the estimated AF per SPI over all HS-DSCH connections belonging to the SPI group. The SPI may be a best effort SPI, and in this case the guaranteed bit rate may be a minimum guaranteed bit rate.

Below are provided further descriptions of non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments.

Figure 4:
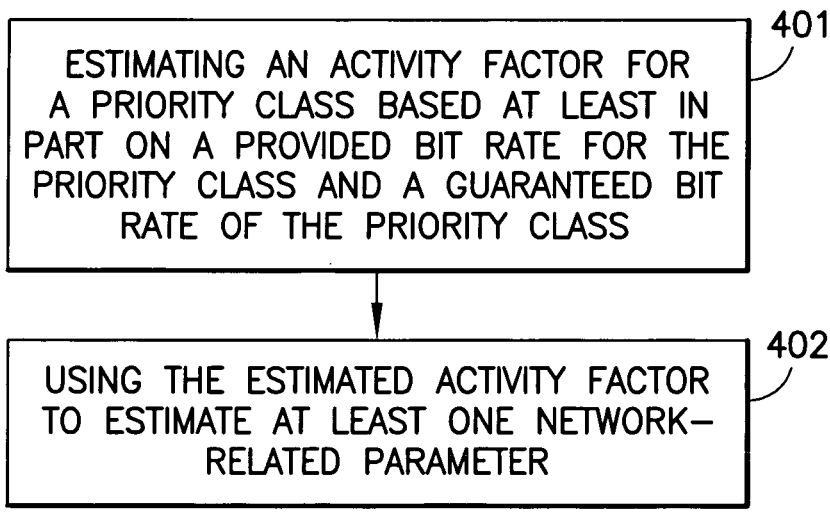
FIG. 4 depicts a flowchart illustrating one non-limiting example of a method for practicing the exemplary embodiments of this invention.

(1) In one exemplary embodiment and as shown in FIG. 4, a method comprising: estimating an activity factor for a priority class based at least in part on a provided bit rate for the priority class and a guaranteed bit rate of the priority class (box 401); and using the estimated activity factor to estimate at least one network-related parameter (box 402).

A method as above, wherein the priority class is identified using a scheduling priority indicator. A method as in any above, wherein the provided bit rate for the priority class comprises a high speed downlink shared channel (HS-DSCH) provided bit rate for the priority class. A method as in any above, wherein the estimated at least one network-related parameter is indicative of at least one of a power used for existing connections of the priority class, a power used for existing high speed downlink packet access (HSDPA) connections of the priority class and a quality of service factor in terms of bit rate. A method as in any above, further comprising: averaging the estimated activity factor over all high speed downlink shared channel (HS-DSCH) connections belonging to the priority class. A method as in any above, wherein the priority class comprises a best effort class and the guaranteed bit rate comprises a minimum guaranteed bit rate.

A method as in any above, wherein the method is implemented by a component of a wideband code division multiple access system. A method as in any above, wherein the method is implemented by a network element of a wideband code division multiple access system. A method as in any above, further comprising: utilizing the estimated network-related parameter as a factor in determining whether a user is admitted to a corresponding network. A method as in any above, wherein the method is implemented by a radio network controller of a wireless communication system. A method as in any above, wherein the method is implemented by a network element. A method as in any above, wherein the method is implemented by a computer program.

(2) In another exemplary embodiment, a program storage device readable by a machine, tangibly embodying a program of instructions executable by the machine for performing operations, the operations comprising: estimating an activity factor for a priority class based at least in part on a provided bit rate for the priority class and a guaranteed bit rate of the priority class; and using the estimated activity factor to estimate at least one network-related parameter.

A program storage device as above, wherein the priority class is identified using a scheduling priority indicator. A program storage device as in any above, wherein the provided bit rate for the priority class comprises a high speed downlink shared channel (HS-DSCH) provided bit rate for the priority class. A program storage device as in any above, wherein the estimated at least one network-related parameter is indicative of at least one of a power used for existing connections of the priority class, a power used for existing high speed downlink packet access (HSDPA) connections of the priority class and a quality of service factor in terms of bit rate. A program storage device as in any above, the operations further comprising: averaging the estimated activity factor over all high speed downlink shared channel (HS-DSCH) connections belonging to the priority class. A program storage device as in any above, wherein the priority class comprises a best effort class and the guaranteed bit rate comprises a minimum guaranteed bit rate.

A program storage device as in any above, wherein the program storage device comprises a component of a wideband code division multiple access system. A program storage device as in any above, wherein the program storage device comprises a network element of a wideband code division multiple access system. A program storage device as in any above, the operations further comprising: utilizing the estimated network-related parameter as a factor in determining whether a user is admitted to a corresponding network. A program storage device as in any above, wherein the program storage device comprises a radio network controller of a wireless communication system. A program storage device as in any above, wherein the program storage device comprises a network element.

(3) In another exemplary embodiment, an apparatus comprising: a memory configured to store a provided bit rate for a priority class and a guaranteed bit rate of the priority class; and a processor configured to estimate an activity factor for the priority class based at least in part on the provided bit rate and the guaranteed bit rate, wherein the processor is further configured to use the estimated activity factor to estimate at least one network-related parameter.

An apparatus as above, wherein the priority class is identified using a scheduling priority indicator. An apparatus as in any above, wherein the provided bit rate for the priority class comprises a high speed downlink shared channel (HS-DSCH) provided bit rate for the priority class. An apparatus as in any above, wherein the estimated at least one network-related parameter is indicative of at least one of a power used for existing connections of the priority class, a power used for existing high speed downlink packet access (HSDPA) connections of the priority class and a quality of service factor in terms of bit rate. An apparatus as in any above, wherein the processor is further configured to average the estimated activity factor over all high speed downlink shared channel (HS-DSCH) connections belonging to the priority class. An apparatus as in any above, wherein the priority class comprises a best effort class and the guaranteed bit rate comprises a minimum guaranteed bit rate.

An apparatus as in any above, wherein the apparatus comprises a component of a wideband code division multiple access system. An apparatus as in any above, wherein the apparatus comprises a network element of a wideband code division multiple access system. An apparatus as in any above, wherein the processor is further configured to utilize the estimated network-related parameter as a factor in determining whether a user is admitted to a corresponding network. An apparatus as in any above, wherein the apparatus comprises a radio network controller of a wireless communication system. An apparatus as in any above, wherein the apparatus comprises a network element.

(4) In another exemplary embodiment, an apparatus comprising: means for storing a provided bit rate for a priority class and a guaranteed bit rate of the priority class; means for estimating an activity factor for the priority class based at least in part on the provided bit rate and the guaranteed bit rate; and means for using the estimated activity factor to estimate at least one network-related parameter.

An apparatus as above, wherein the means for storing comprises a memory and the means for estimating and means for using comprise a processor. An apparatus as in any above, wherein the priority class is identified using a scheduling priority indicator. An apparatus as in any above, wherein the provided bit rate for the priority class comprises a high speed downlink shared channel (HS-DSCH) provided bit rate for the priority class. An apparatus as in any above, wherein the estimated at least one network-related parameter is indicative of at least one of a power used for existing connections of the priority class, a power used for existing high speed downlink packet access (HSDPA) connections of the priority class and a quality of service factor in terms of bit rate. An apparatus as in any above, further comprising: means for averaging the estimated activity factor over all high speed downlink shared channel (HS-DSCH) connections belonging to the priority class. An apparatus as in any above, wherein the priority class comprises a best effort class and the guaranteed bit rate comprises a minimum guaranteed bit rate.

An apparatus as in any above, wherein the apparatus comprises a component of a wideband code division multiple access system. An apparatus as in any above, wherein the apparatus comprises a network element of a wideband code division multiple access system. An apparatus as in any above, further comprising: means for utilizing the estimated network-related parameter as a factor in determining whether a user is admitted to a corresponding network. An apparatus as in any above, wherein the apparatus comprises a radio network controller of a wireless communication system. An apparatus as in any above, wherein the apparatus comprises a network element.

(5) In another exemplary embodiment, an apparatus comprising: a memory configured to store a provided bit rate for a priority class and a guaranteed bit rate of the priority class; and a processor configured to estimate an activity factor for the priority class based at least in part on the provided bit rate and the guaranteed bit rate. An apparatus as above, further comprising one or more additional aspects of the exemplary embodiments of the invention.

(6) In another exemplary embodiment, an apparatus comprising: means for storing a provided bit rate for a priority class and a guaranteed bit rate of the priority class; and means for estimating an activity factor for the priority class based at least in part on the provided bit rate and the guaranteed bit rate. An apparatus as above, wherein the means for storing comprises a memory and the means for estimating comprises a processor. An apparatus as in any above, further comprising one or more additional aspects of the exemplary embodiments of the invention.

(7) In another exemplary embodiment, an apparatus comprising: means for estimating an activity factor for a priority class based at least in part on a provided bit rate for the priority class and a guaranteed bit rate for the priority class; and means for using the estimated activity factor to estimate at least one network-related parameter. An apparatus as above, further comprising one or more additional aspects of the exemplary embodiments of the invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, and as was noted above, while the exemplary embodiments have been described above in the context of the HSDPA system, it should be appreciated that the exemplary embodiments of this invention are not limited for use with only this one particular type of wireless communication system, and that they may be used to advantage in other wireless communication systems. One non-limiting example of another system where the exemplary embodiments of this invention may be employed is one currently being specified and known as the long term evolution (LTE) of UTRAN (UTRAN-LTE) or as evolved UTRAN (E-UTRAN).

Further, the estimation of the AF has been described in the context of certain exemplary estimation approaches. However, the AF may be estimated by some other approach, or by a modification of one of the disclosed approaches, and the resultant estimated AF may still be used to advantage by the RRM functionality, as described above in the exemplary applications and examples. Further, the estimated AF (by whatever technique) may be used for other purposes, e.g., other than by the AC, LC and/or HC functionality.

Further still, while the exemplary embodiments of this invention have been generally described as being executed in, or resident in, the RNC 14, the disclosed functionality may be located elsewhere, such as in the Node B 12. In this case the Iub, or some other signaling, may be modified accordingly.

Section 2

Below are described additional exemplary embodiments of the invention. The below-described exemplary embodiments and/or various aspects thereof may be utilized in conjunction with one or more of the above-described exemplary embodiments or one or more aspects thereof.

Some exemplary embodiments of the invention may pertain specifically to the HSUPA system and, furthermore, the application of the PIE to RRM algorithms requiring radio resource estimation. For example, the AC, PS and LC are concerned with this type of estimation.

The PIE requires as an input the user data rate as well as its associated AF. Note that it is assumed that the signal bandwidth and $E_b/N_0$ are known. In some conventional systems the AF is merely guessed. As noted above, obtaining a proper estimation of the AF is useful.

In further exemplary embodiments of the invention, the AF is estimated based on an existing NBAP measurement (e.g., of the EPBR) and an attribute from the QoS profile associated with the obtained PDP context. Both of these are known at the Node B and RNC.

Reference is made to section 11.8.2.4 of TS 25.321 V7.1.0 regarding the EPBR. See 3GPP TS 25.321 V7.1.0 (2006-06), "3rd Generation partnership Project; Technical Specification Group Radio Access Network; Medium Access Control (MAC) protocol specification (Release 7)," Jun. 23, 2006. For each priority class, the Node B reports to the RNC the total number of MAC-d PDU bits considered successfully transmitted by the Node B-based MAC-e function during the last measurement period divided by the duration of the measurement period. The measurement period may be fixed, for example, at 100 ms.

A priority class can be identified by the SPI. The SPI usually involves a mapping of various attributes such as the TC, ARP and/or THC attributes, for example. The GBR is known at both the Node B and the RNC.

Further exemplary embodiments of the invention combine the measurement and the attribute to estimate the AF of the connections belonging to a given priority class (SPI). The EPBR is divided by the sum of the GBR for all users of the considered SPI class. The resulting ratio is a suitable estimation of the AF.

Such exemplary embodiments utilize the measurements (e.g., EPBR per SPI class) provided to the RNC (and available at the Node B) and the GBR attribute to evaluate the AF of a new connection, for example, in order to use the estimated AF in the PIE. The exemplary embodiments may be implemented by the AC, the LC or the PS. As non-limiting examples, the AC and/or the LC RRM algorithms may utilize the described exemplary techniques in the RNC while the PS utilizes the exemplary techniques in the Node B.

Exemplary embodiments of the invention may be particularly useful, for example, in the context of provisioning RT services on HSUPA which require enhancements to the existing QoS-blind RRM algorithms.

Below are provided further descriptions of non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments.

Figure 5:
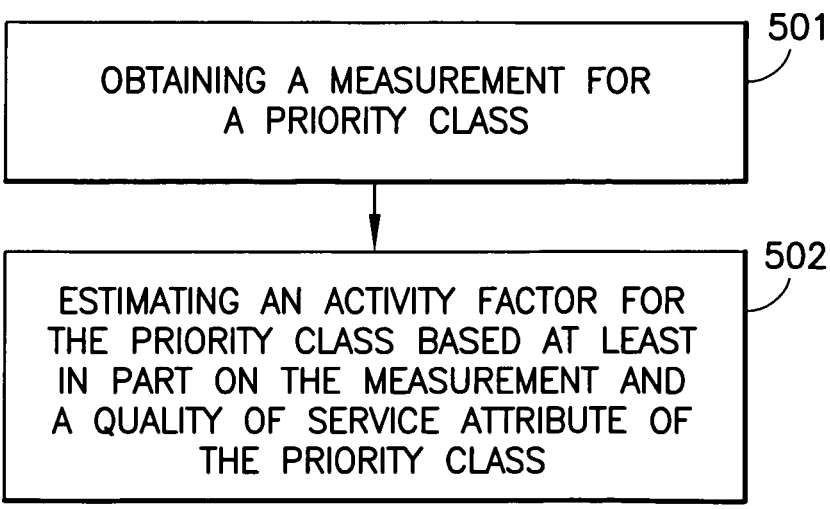
FIG. 5 depicts a flowchart illustrating one non-limiting example of a method for practicing the exemplary embodiments of this invention.

(1) In one exemplary embodiment, and as shown in FIG. 5, a method comprising: obtaining a measurement for a priority class (box 501); and estimating an activity factor for the priority class based at least in part on the measurement and a quality of service attribute of the priority class (box 502).

A method as above, wherein the priority class is identified using a scheduling priority indicator. A method as in any above, wherein the measurement is obtained by a Node B application part. A method as in any above, wherein the measurement comprises, a measurement of a provided bit rate for the priority class. A method as in any above, wherein the quality of service attribute comprises a guaranteed bit rate for the priority class. A method as in any above, further comprising: performing the measurement for the priority class. A method as in any above, wherein estimating the activity factor for the priority class comprises dividing the provided bit rate by a sum of the guaranteed bit rate for all users of the priority class. A method as in any above, wherein the measurement comprises a measurement of an enhanced uplink dedicated channel (E-DCH) provided bit rate for the priority class. A method as in any above, further comprising: utilizing the estimated activity factor in a power increase estimator. A method as in any above, wherein the method is implemented by at least one of: admission control, load control and a packet scheduler. A method as in any above, wherein the measurement comprises a measurement of a high speed uplink channel provided bit rate for the priority class. A method as in any above, wherein the measurement comprises an E-DCH provided bit rate.

A method as in any above, further comprising: using the estimated activity factor to estimate at least one network-related parameter. A method as in any above, wherein the estimated at least one network-related parameter is indicative of at least one of a power used for existing connections of the priority class, a power used for existing HSUPA connections of the priority class and a quality of service factor in terms of bit rate. A method as in any above, further comprising: averaging the estimated activity factor over all high speed uplink channel connections belonging to the priority class. A method as in any above, wherein the priority class comprises a best effort class and the guaranteed bit rate comprises a minimum guaranteed bit rate. A method as in any above, wherein the method is implemented by a component of a wideband code division multiple access system. A method as in any above, further comprising: utilizing the estimated network-related parameter as a factor in determining whether a user is admitted to a corresponding network. A method as in any above, wherein the method is implemented by a radio network controller of a wireless communication system. A method as in any above, wherein the method is implemented by a network element. A method as in any above, wherein the method is implement by a computer program.

(2) In another exemplary embodiment, a program storage device readable by a machine, tangibly embodying a program of instructions executable by the machine for performing operations, the operations comprising: obtaining a measurement for a priority class; and estimating an activity factor for the priority class based at least in part on the measurement and a quality of service attribute of the priority class.

A program storage device as above, wherein the priority class is identified using a scheduling priority indicator. A program storage device as in any above, wherein the measurement is obtained by a Node B application part. A program storage device as in any above, wherein the measurement comprises a measurement of a provided bit rate for the priority class. A program storage device as in any above, wherein the quality of service attribute comprises a guaranteed bit rate for the priority class. A program storage device as in any above, the operations further comprising: performing the measurement for the priority class. A program storage device as in any above, wherein estimating the activity factor for the priority class comprises dividing the provided bit rate by a sum of the guaranteed bit rate for all users of the priority class. A program storage device as in any above, wherein the measurement comprises a measurement of an enhanced uplink dedicated channel (E-DCH) provided bit rate for the priority class. A program storage device as in any above, the operations further comprising: utilizing the estimated activity factor in a power increase estimator. A program storage device as in any above, wherein the program storage device comprises at least one of: admission control, load control and a packet scheduler. A program storage device as in any above, wherein the measurement comprises a measurement of a high speed uplink channel provided bit rate for the priority class. A program storage device as in any above, wherein the measurement comprises an E-DCH provided bit rate.

A program storage device as in any above, the operations further comprising: using the estimated activity factor to estimate at least one network-related parameter. A program storage device as in any above, wherein the estimated at least one network-related parameter is indicative of at least one of a power used for existing connections of the priority class, a power used for existing HSUPA connections of the priority class and a quality of service factor in terms of bit rate. A program storage device as in any above, the operations further comprising: averaging the estimated activity factor over all high speed uplink channel connections belonging to the priority class. A program storage device as in any above, wherein the priority class comprises a best effort class and the guaranteed bit rate comprises a minimum guaranteed bit rate. A program storage device as in any above, wherein the program storage device comprises a component of a wideband code division multiple access system. A program storage device as in any above, the operations further comprising: utilizing the estimated network-related parameter as a factor in determining whether a user is admitted to a corresponding network. A program storage device as in any above, wherein the program storage device comprises a radio network controller of a wireless communication system. A program storage device as in any above, wherein the program storage device comprises a network element.

(3) In another exemplary embodiment, an apparatus comprising: a memory configured to store a measurement for a priority class; and a processor configured to estimate an activity factor for the priority class based at least in part on the measurement and a quality of service attribute of the priority class.

An apparatus as above, wherein the priority class is identified using a scheduling priority indicator. An apparatus as in any above, wherein the measurement is obtained by a Node B application part. An apparatus as in any above, wherein the measurement comprises a measurement of a provided bit rate for the priority class. An apparatus as in any above, wherein the quality of service attribute comprises a guaranteed bit rate for the priority class. An apparatus as in any above, wherein the processor is further configured to perform the measurement for the priority class. An apparatus as in any above, wherein estimating the activity factor for the priority class comprises dividing the provided bit rate by a sum of the guaranteed bit rate for all users of the priority class. An apparatus as in any above, wherein the measurement comprises a measurement of an enhanced uplink dedicated channel (E-DCH) provided bit rate for the priority class. An apparatus as in any above, wherein the processor is further configured to utilize the estimated activity factor in a power increase estimator. An apparatus as in any above, wherein the apparatus comprises at least one of: admission control, load control and a packet scheduler. An apparatus as in any above, wherein the measurement comprises a measurement of a high speed uplink channel provided bit rate for the priority class. An apparatus as in any above, wherein the measurement comprises an E-DCH provided bit rate.

An apparatus as in any above, wherein the processor is further configured to use the estimated activity factor to estimate at least one network-related parameter. An apparatus as in any above, wherein the estimated at least one network-related parameter is indicative of at least one of a power used for existing connections of the priority class, a power used for existing HSUPA connections of the priority class and a quality of service factor in terms of bit rate. An apparatus as in any above, wherein the processor is further configured to average the estimated activity factor over all high speed uplink channel connections belonging to the priority class. An apparatus as in any above, wherein the priority class comprises a best effort class and the guaranteed bit rate comprises a minimum guaranteed bit rate. An apparatus as in any above, wherein the apparatus comprises a component of a wideband code division multiple access system. An apparatus as in any above, wherein the processor is further configured to utilize the estimated network-related parameter as a factor in determining whether a user is admitted to a corresponding network. An apparatus as in any above, wherein the apparatus comprises a radio network controller of a wireless communication system. An apparatus as in any above, wherein the apparatus comprises a network element. An apparatus as in any above, wherein the apparatus comprises a base station or radio resource controller.

(4) In another exemplary embodiment, an apparatus comprising: means for storing a measurement for a priority class; and means for estimating an activity factor for the priority class based at least in part on the measurement and a quality of service attribute of the priority class.

An apparatus as above, wherein the means for storing comprises a memory and the means for estimating comprises a processor. An apparatus as in any above, wherein the priority class is identified using a scheduling priority indicator. An apparatus as in any above, wherein the measurement is obtained by a Node B application part. An apparatus as in any above, wherein the measurement comprises a measurement of a provided bit rate for the priority class. An apparatus as in any above, wherein the quality of service attribute comprises a guaranteed bit rate for the priority class. An apparatus as in any above, further comprising: means for performing the measurement for the priority class. An apparatus as in any above, wherein estimating the activity factor for the priority class comprises dividing the provided bit rate by a sum of the guaranteed bit rate for all users of the priority class. An apparatus as in any above, wherein the measurement comprises a measurement of an enhanced uplink dedicated channel (E-DCH) provided bit rate for the priority class. An apparatus as in any above, further comprising: means for utilizing the estimated activity factor in a power increase estimator. An apparatus as in any above, wherein the apparatus comprises at least one of: admission control, load control and a packet scheduler. An apparatus as in any above, wherein the measurement comprises a measurement of a high speed uplink channel provided bit rate for the priority class. An apparatus as in any above, wherein the measurement comprises an E-DCH provided bit rate.

An apparatus as in any above, further comprising: means for using the estimated activity factor to estimate at least one network-related parameter. An apparatus as in any above, wherein the estimated at least one network-related parameter is indicative of at least one of a power used for existing connections of the priority class, a power used for existing HSUPA connections of the priority class and a quality of service factor in terms of bit rate. An apparatus as in any above, further comprising: means for averaging the estimated activity factor over all high speed uplink channel connections belonging to the priority class. An apparatus as in any above, wherein the priority class comprises a best effort class and the guaranteed bit rate comprises a minimum guaranteed bit rate. An apparatus as in any above, wherein the apparatus comprises a component of a wideband code division multiple access system. An apparatus as in any above, further comprising: means for utilizing the estimated network-related parameter as a factor in determining whether a user is admitted to a corresponding network. An apparatus as in any above, wherein the apparatus comprises a radio network controller of a wireless communication system. An apparatus as in any above, wherein the apparatus comprises a network element. An apparatus as in any above, wherein the apparatus comprises a base station or radio resource controller.

Additional Considerations

The various blocks shown in FIGS. 4 and 5 may be viewed as method steps, and/or as operations that result from operation of computer program code, and/or as operations that are performed by a processor of an apparatus, and/or as one or more coupled logic circuit elements constructed to carry out the associated function(s).

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   estimating, by a processor, an activity factor for a priority class based on a provided bit rate for the priority class and a guaranteed bit rate of the priority class, wherein the activity factor defines a percentage of time that a user is active; and
   using, by the processor, the estimated activity factor to estimate at least one network-related parameter.

2. A method as in claim 1, wherein the provided bit rate for the priority class comprises a high speed downlink shared channel (HS-DSCH) provided bit rate for the priority class.

3. A method as in claim 1, wherein the estimated at least one network-related parameter is indicative of at least one of a power used for existing connections of the priority class, a power used for existing high speed downlink packet access (HSDPA) connections of the priority class and a quality of service factor in terms of bit rate.

4. A method as in claim 1, further comprising: utilizing the estimated network-related parameter as a factor in determining whether a user is admitted to a corresponding network.

5. A method as in claim 1, wherein the method is implemented by a network element of a wideband code division multiple access system.

6. A non-transitory program storage device readable by a computer, storing a program of instructions executable by the computer for performing operations, the operations comprising:
   estimating an activity factor for a priority class based on a provided bit rate for the priority class and a guaranteed bit rate of the priority class, wherein the activity factor defines a percentage of time that a user is active; and
   using the estimated activity factor to estimate at least one network-related parameter.

7. A non-transitory program storage device as in claim 6, wherein the provided bit rate for the priority class comprises a high speed downlink shared channel (HS-DSCH) provided bit rate for the priority class.

8. A non-transitory program storage device as in claim 6, wherein the estimated at least one network-related parameter is indicative of at least one of a power used for existing connections of the priority class, a power used for existing high speed downlink packet access (HSDPA) connections of the priority class and a quality of service factor in terms of bit rate.

9. A non-transitory program storage device as in claim 6, the operations further comprising: utilizing the estimated network-related parameter as a factor in determining whether a user is admitted to a corresponding network.

10. A non-transitory program storage device as in claim 6, wherein the program storage device comprises a network element of a wideband code division multiple access system.

11. An apparatus comprising:
   a memory configured to store a provided bit rate for a priority class and a guaranteed bit rate of the priority class; and
   a processor configured to estimate an activity factor for the priority class based on the provided bit rate and the guaranteed bit rate, wherein the activity factor defines a percentage of time that a user is active,
   wherein the processor is further configured to use the estimated activity factor to estimate at least one network-related parameter.

12. An apparatus as in claim 11, wherein the provided bit rate for the priority class comprises a high speed downlink shared channel (HS-DSCH) provided bit rate for the priority class.

13. An apparatus as in claim 11, wherein the estimated at least one network-related parameter is indicative of at least one of a power used for existing connections of the priority class, a power used for existing high speed downlink packet access (HSDPA) connections of the priority class and a quality of service factor in terms of bit rate.

14. An apparatus as in claim 11, wherein the processor is further configured to utilize the estimated network-related parameter as a factor in determining whether a user is admitted to a corresponding network.

15. An apparatus as in claim 11, wherein the apparatus comprises a network element of a corresponding network.

16. A method comprising:
   obtaining, by a processor, a measurement for a priority class; and
   estimating, by the processor, an activity factor for the priority class based on the measurement and a quality of service attribute of the priority class, wherein the activity factor defines a percentage of time that a user is active, wherein the measurement comprises a measurement of a provided bit rate for the priority class, wherein the quality of service attribute comprises a guaranteed bit rate for the priority class.

17. A method as in claim 16, wherein the measurement is obtained by a Node B application part.

18. A method as in claim 16, further comprising: utilizing the estimated activity factor in a power increase estimator.

19. A method as in claim 16, wherein the measurement comprises an enhanced uplink dedicated channel (E-DCH) provided bit rate.

20. A method as in claim 16, wherein the measurement comprises a high-speed downlink packet access (HSDPA) provided bit rate.

21. A non-transitory program storage device readable by a computer, storing a program of instructions executable by the computer for performing operations, the operations comprising:
   obtaining a measurement for a priority class; and
   estimating an activity factor for the priority class based on the measurement and a quality of service attribute of the priority class, wherein the activity factor defines a percentage of time that a user is active, wherein the measurement comprises a measurement of a provided bit rate for the priority class, wherein the quality of service attribute comprises a guaranteed bit rate for the priority class.

22. A non-transitory program storage device as in claim 21, wherein the measurement is obtained by a Node B application part.

23. A non-transitory program storage device as in claim 21, the operations further comprising: utilizing the estimated activity factor in a power increase estimator.

24. A non-transitory program storage device as in claim 21, wherein the measurement comprises an enhanced uplink dedicated channel (E-DCH) provided bit rate.

25. A non-transitory program storage device as in claim 21, wherein the measurement comprises a high-speed downlink packet access (HSDPA) provided bit rate.

26. An apparatus comprising:
   a memory configured to store a measurement for a priority class; and
   a processor configured to estimate an activity factor for the priority class based on the measurement and a quality of service attribute of the priority class, wherein the activity factor defines a percentage of time that a user is active, wherein the measurement comprises a measurement of a provided bit rate for the priority class, wherein the quality of service attribute comprises a guaranteed bit rate for the priority class.

27. An apparatus as in claim 26, wherein the measurement is obtained by a Node B application part.

28. An apparatus as in claim 26, wherein the processor is further configured to utilize the estimated activity factor in a power increase estimator.

29. An apparatus as in claim 26, wherein the measurement comprises an enhanced uplink dedicated channel (E-DCH) provided bit rate.

30. An apparatus as in claim 26, wherein the measurement comprises a high-speed downlink packet access (HSDPA) provided bit rate.

* * * * *